(12) United States Patent
Earhart et al.

(10) Patent No.: US 10,753,226 B1
(45) Date of Patent: Aug. 25, 2020

(54) REVERSE VORTEX RING (RVR) FOR DRAMATIC IMPROVEMENTS IN ROCKET ENGINE TURBOMACHINERY ROTORDYNAMIC STABILITY MARGINS

(71) Applicant: United States of America as represented by the Administrator of NASA, Washington, DC (US)

(72) Inventors: Eric M. Earhart, Huntsville, AL (US); J. Mark Darden, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/405,450

(22) Filed: May 7, 2019

(51) Int. Cl.
| F15C 1/06 | (2006.01) |
| F01D 25/04 | (2006.01) |
| F01D 25/16 | (2006.01) |
| F15D 1/00 | (2006.01) |

(52) U.S. Cl.
CPC .......... *F01D 25/04* (2013.01); *F01D 25/164* (2013.01); *F15D 1/009* (2013.01); *F05D 2250/294* (2013.01); *F05D 2250/61* (2013.01); *F05D 2260/96* (2013.01)

(58) Field of Classification Search
CPC ........ F01D 25/04; F01D 25/164; F15D 1/009; F05D 2250/294; F05D 2250/61; F05D 2260/96
USPC .......... 137/808, 809, 810, 811; 73/593, 665, 73/526; 74/900
See application file for complete search history.

(56) References Cited

U.S. PATENT DOCUMENTS

| 6,536,468 B1* | 3/2003 | Wilmer ................. B01F 3/0857 137/544 |
| 6,839,234 B2* | 1/2005 | Niwatsukino ....... F28D 15/0266 165/80.3 |
| 2008/0304972 A1* | 12/2008 | Xiao ..................... F04D 29/668 416/203 |
| 2010/0322755 A1* | 12/2010 | Tecza .................... F04D 29/542 415/1 |
| 2011/0027085 A1* | 2/2011 | Glasspoole ............. F01D 25/04 416/145 |
| 2011/0121519 A1* | 5/2011 | Justak ................... F01D 11/025 277/412 |
| 2014/0216191 A1* | 8/2014 | Marsaudon ............ F16H 55/06 74/434 |

(Continued)

*Primary Examiner* — Minh Q Le
(74) *Attorney, Agent, or Firm* — James J. McGroary; Helen M. Galus

(57) ABSTRACT

A flat reverse vortex ring is sized and shaped to either attach to or be formed as part of a distal end of a sleeve bearing or seal. The ring has a series of evenly spaced radial channels that extend from an inner diameter to an outer diameter of the ring. The channels have a depth. The ring has an upper surface with an alternating series of planar surfaces and openings located at an upper end of the channels. The ring may have an interior diameter equal to an interior diameter of the sleeve bearing or seal. The ring may have an exterior diameter equal to an exterior diameter the sleeve bearing or seal. The channels may be semi-cylindrical. The channels have a diameter and the depth is a predetermined portion of the diameter. The channels may be rectangular in cross-section with a height-to-width ratio of between 0.5 and 1.5.

10 Claims, 6 Drawing Sheets

(56) References Cited

U.S. PATENT DOCUMENTS

| | | | | |
|---|---|---|---|---|
| 2015/0369080 | A1* | 12/2015 | Arghir | F01D 25/24 |
| | | | | 415/119 |
| 2016/0069269 | A1* | 3/2016 | Hyland | F01D 11/025 |
| | | | | 415/1 |
| 2016/0076397 | A1* | 3/2016 | Eshak | F01D 25/30 |
| | | | | 415/119 |
| 2016/0146106 | A1* | 5/2016 | Baudoin | F04D 19/002 |
| | | | | 415/119 |
| 2017/0292449 | A1* | 10/2017 | Agara | F01D 25/18 |
| 2018/0038282 | A1* | 2/2018 | Kugimiya | F23R 3/002 |
| 2018/0163751 | A1* | 6/2018 | Edwards | F04D 29/668 |
| 2018/0258853 | A1* | 9/2018 | Marchaj | F02K 1/827 |
| 2018/0355909 | A1* | 12/2018 | Yoshino | F01D 25/168 |
| 2019/0063261 | A1* | 2/2019 | Varney | F16C 33/104 |
| 2019/0120254 | A1* | 4/2019 | Duffy | F01D 5/22 |
| 2020/0096041 | A1* | 3/2020 | Wojtyczka | F16C 27/02 |

* cited by examiner

REVERSE VORTEX RING (RVR) FOR DRAMATIC IMPROVEMENTS IN ROCKET ENGINE TURBOMACHINERY ROTORDYNAMIC STABILITY MARGINS

ORIGIN OF THE INVENTION

The invention described herein was made by an employee of the United States Government and may be manufactured and used by or for the Government of the United States of America for governmental purposes without the payment of any royalties thereon or therefor.

FIELD OF INVENTION

This invention relates to the field of vibration abatement for high speed rotating machinery, and more specifically to vibration problems associated with highly preswirled fluid entering tight clearance locations such as seals and fluid bearings in such machinery.

BACKGROUND OF THE INVENTION

With the advent of rotating machinery, high-speed rotors have been of interest to engineers. Rotating machinery has been employed in a wide range of applications in the past century. These applications range from steam turbines for electric power generation to the turbopumps used in the Space Shuttle Main Engines. As these machines have become more commonplace there has been an increased demand for lightweight, compact designs. The required power output of these units has also increased leading to ever high power to weight ratios. These leaner designs are the hallmark of the aerospace industry. Vibration problems, which occur more frequently in high power to weight machines, often lead to costly down time (and subsequent redesign) and, in some instances, catastrophic failure. A disproportionate number of vibration problems in rotating machinery can be attributed to highly preswirled fluid entering tight clearance locations such as seals and fluid bearings. The relationship between high fluid pre-swirl and undesirable vibration issues is clear. Machines with high levels of fluid pre-swirl are more susceptible to instabilities and vibration problems. A top priority in rotordynamic design, therefore, is to develop devices to minimize the level of fluid pre-swirl entering tight clearance locations. The reverse vortex ring has been found to not only minimize this detrimental pre-swirl but to actually reverse the direction of the swirl. A characteristic that historically has been detrimental to rotating machinery has now become an asset to ameliorate vibration issues through the use of the reverse vortex ring (RVR).

It is an objective of the present invention to provide an apparatus for reducing vibration in high-speed rotating machinery induced by pre-swirled fluid entering tight clearance locations such as seals and fluid bearings. It is a further objective to provide an apparatus that involves a minimum of modifications to existing machinery designs. It is a still further objective of the invention to minimize the number, complexity and weight of any parts that must be added to reduce such vibrations. It is yet a further objective to provide an apparatus that is durable and simple to manufacture. Finally, it is an objective of the present invention to provide an apparatus that may be scaled to a wide variety of applications and that will function efficiently with a wide variety of fluids in varying conditions of temperature, pressure and other conditions.

While some of the objectives of the present invention are disclosed in the prior art, none of the inventions found include all of the requirements identified.

SUMMARY OF THE INVENTION

The present invention addresses all of the deficiencies of prior art turbulence control devices for rotating machinery and satisfies all of the objectives described above.

(1) A reverse vortex ring satisfying all of the above objectives includes the following limitations. A flat ring is provided. The ring is sized and shaped to either attach to, located in front of or formed as part of a distal end of a sleeve bearing or seal. The ring has a series of evenly spaced radial channels. The channels extend from an inner diameter of the ring to an outer diameter of the ring. The channels have a depth. The ring has an upper surface. The upper surface includes a series of planar surfaces alternating with a series of openings. The openings are located at an upper end of the channels.

(2) In a variant of the invention, the inner diameter is equal to an interior diameter of the sleeve bearing.

(3) In another variant, the outer diameter is equal to an exterior diameter the sleeve bearing or seal.

(4) In still another variant, the radial channels are semi-cylindrical.

(5) In yet another variant, the radial channels have a diameter and said depth is a predetermined portion of the diameter.

(6) In a further variant, the predetermined portion is less than 85% of the diameter.

(7) In still a further variant, the radial channels are rectangular in cross-section.

(8) In yet a further variant, a height-to-width ratio of the channels is greater than 0.5 and less than 1.5.

(9) In yet a further variant, the radial channels taper from the outer diameter to the inner diameter of the ring.

(10) In a final variant of the invention, the planar surfaces taper from the outer diameter to the inner diameter of the ring.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-9 illustrate a reverse vortex ring 10 satisfying all of the above objectives that includes the following limitations. A flat ring 14 is provided. The ring 14 is sized and shaped to either attach to, located in front of or formed as part of a distal end 18 of a sleeve bearing or seal 22. The ring 14 has a series of evenly spaced radial channels 26. The channels 26 have a depth 28. The channels 26 extend from an inner diameter 30 of the ring 14 to an outer diameter 34 of the ring 14. The ring 14 has an upper surface 38. The upper surface 38 includes a series of planar surfaces 42 alternating with a series of openings 46. The openings 46 are located at an upper end 50 of the channels 26.

Figure 1:
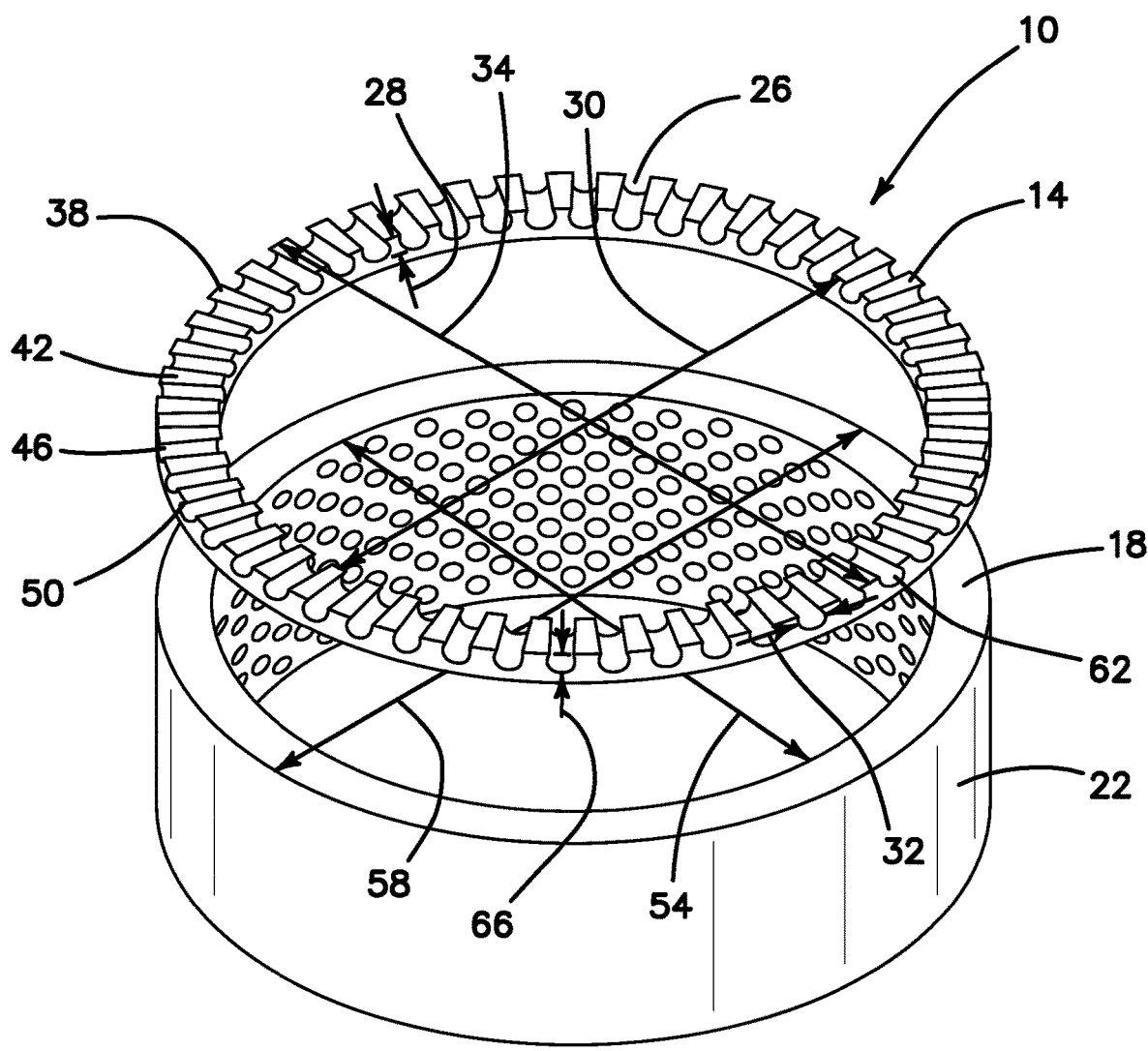
FIG. 1 is a perspective view of the preferred embodiment of the invention illustrating a Reverse Vortex Ring (RVR) and associated sleeve bearing or seal with roughened interior surface.
Figure 2:
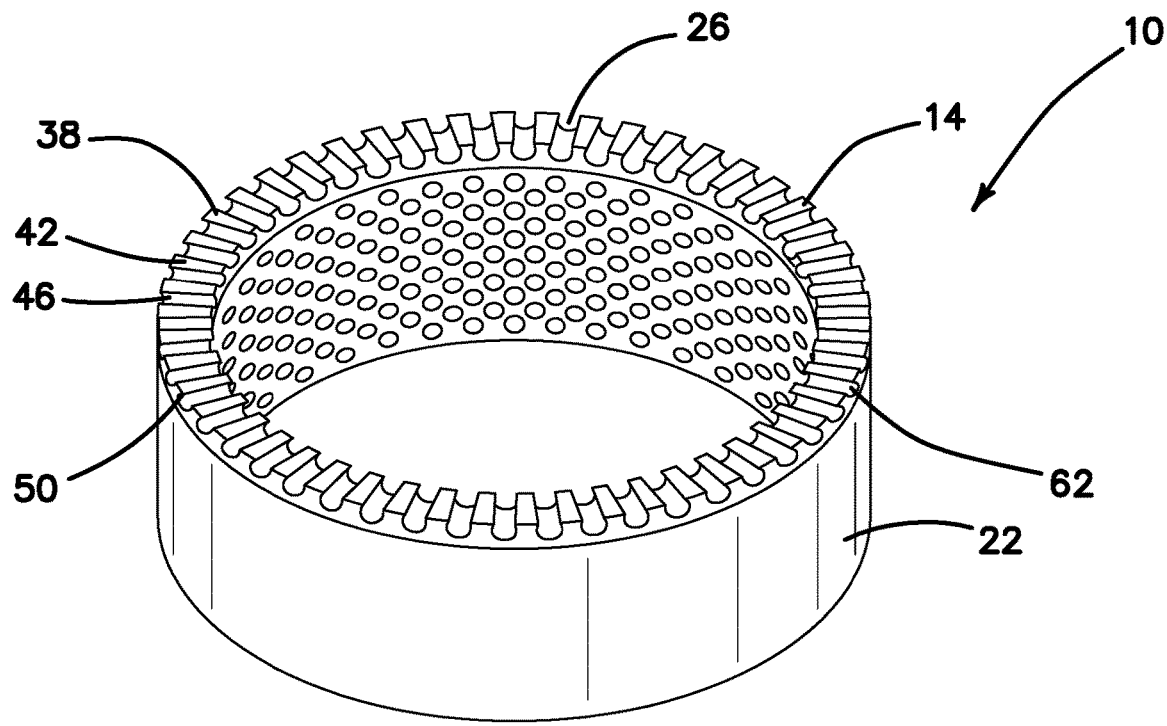
FIG. 2 is a perspective view of the FIG. 1 embodiment mounted to a sleeve bearing or seal with roughened interior surface.
Figure 3:
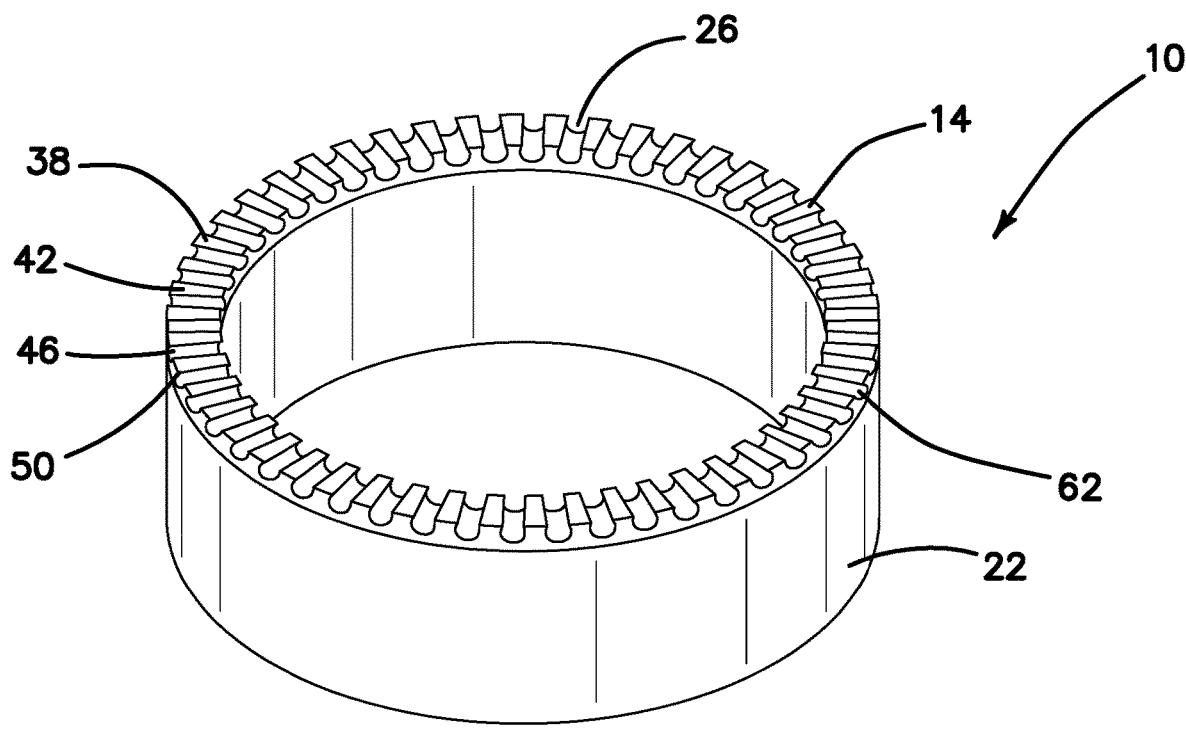
FIG. 3 is a perspective view of the FIG. 1 embodiment mounted to a sleeve bearing with smooth interior surface.
Figure 4:
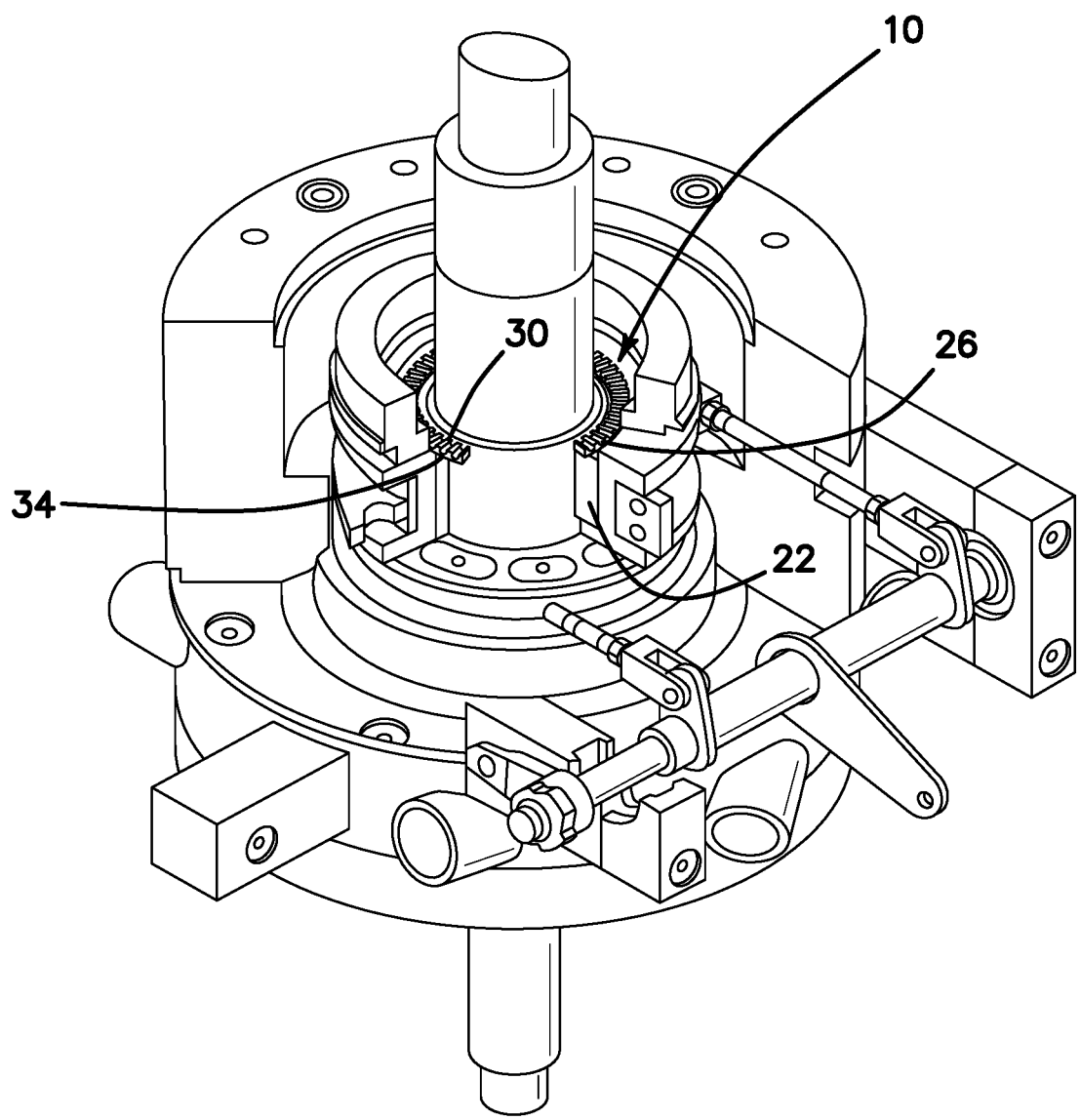
FIG. 4 is a perspective view of the FIG. 1 embodiment mounted to a sleeve bearing and installed in an Annular Seal Test device.
Figure 5:
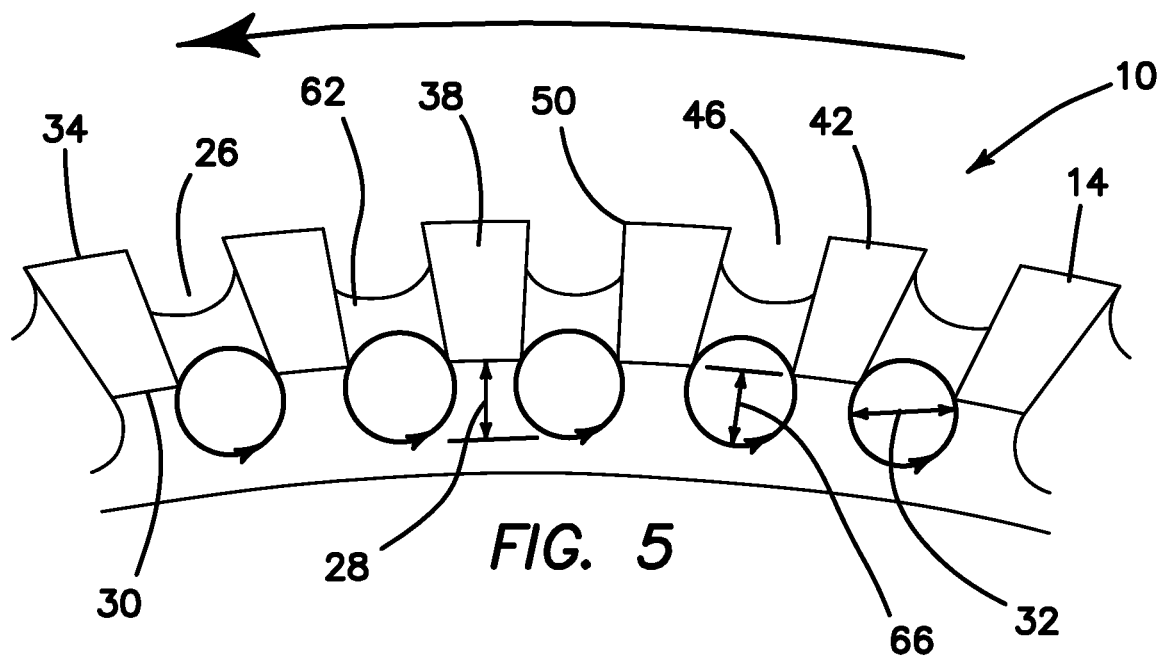
FIG. 5 is a perspective view of a portion of the RVR of the FIG. 1 embodiment illustrating the fluid flow above the RVR and within the chambers of the ring.

(2) In a variant of the invention, the inner diameter 30 is equal to an interior diameter 54 of the sleeve bearing or seal 22.

(3) In another variant, the outer diameter 34 is equal to an exterior diameter 58 of the sleeve bearing or seal 22.

(4) In still another variant, the radial channels 26 are semi-cylindrical 62.

(5) In yet another variant, the radial channels 26 have a diameter 32 and the depth 28 is a predetermined portion 66 of the diameter 32.

(6) In a further variant, the predetermined portion 66 is less than 85% of the diameter.

Figure 6:
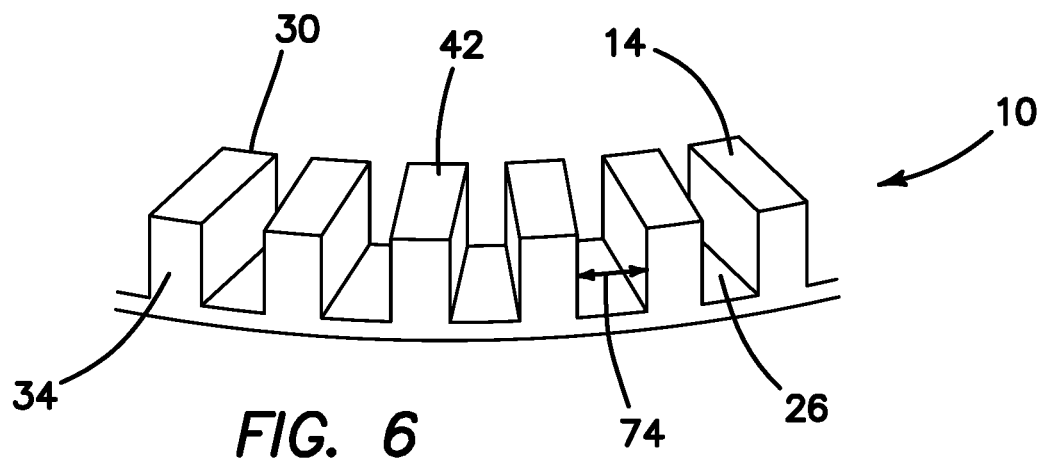
FIG. 6 is a perspective view of an alternative embodiment of the RVR having rectangular channels in which the channels of the ring taper from the outer diameter to the inner diameter of the ring.
Figure 7:
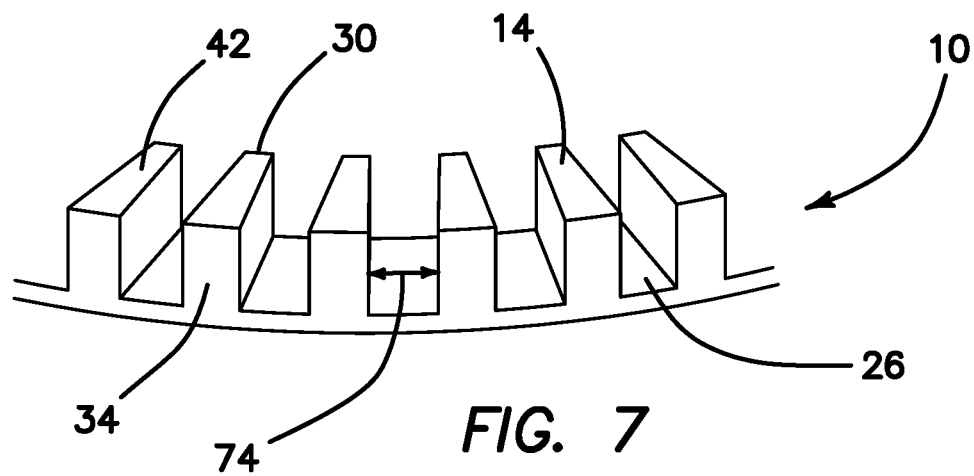
FIG. 7 is a perspective view of an another alternative embodiment of the RVR having rectangular channels in which the planar surfaces of the ring taper from the outer diameter to the inner diameter of the ring.
Figure 8:
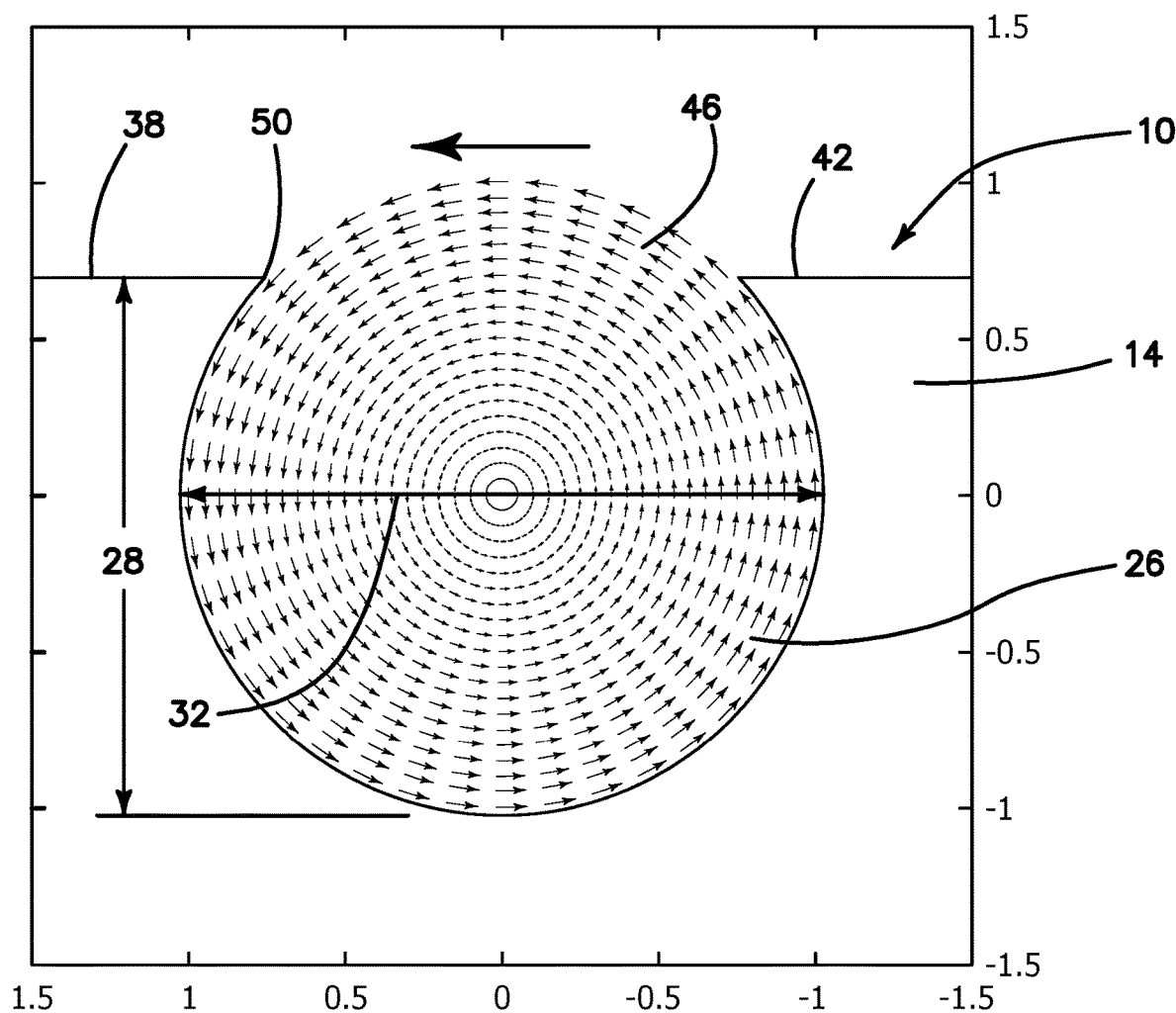
FIG. 8 is a cross-sectional view of a single channel of the FIG. 1 embodiment illustrating the analytical flow velocities of fluid passing over the channel and moving within the channel.
Figure 9:
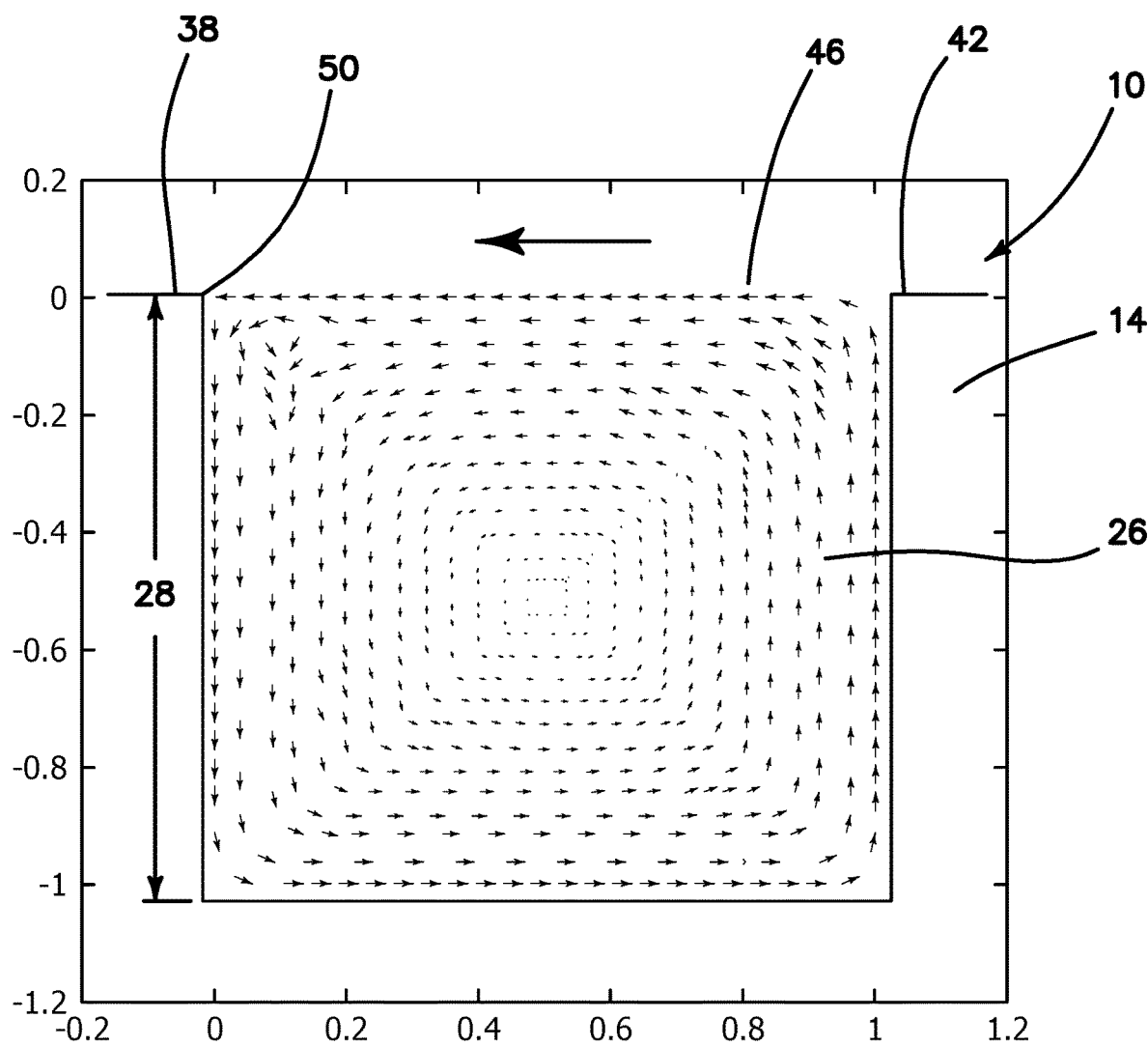
FIG. 9 is a cross-sectional view of a single channel of the FIG. 7 embodiment illustrating the analytical flow velocities of fluid passing over the channel and moving within the channel.

(7) In still a further variant, as illustrated in FIGS. 6, 7 and 9, the radial channels 26 are rectangular 74 in cross-section.

(8) In yet a further variant, as illustrated in FIGS. 1-9, a height-to-width ratio of the channels 26 is greater than 0.5 and less than 1.5.

(9) In another variant of the invention, as illustrated in FIG. 6, the radial channels 26 taper from the outer diameter 34 to the inner diameter 30 of the ring 14.

(10) In a final variant of the invention, as illustrated in FIG. 7, the planar surfaces 42 taper from the outer diameter 34 to the inner diameter 30 of the ring 14.

The reverse vortex ring 10 has been described with reference to particular embodiments. Other modifications and enhancements can be made without departing from the spirit and scope of the claims that follow.

The invention claimed is:

1. A reverse vortex ring comprising:
   a flat ring, said ring being sized and shaped to either attach to, disposed in front of or formed as part of a distal end of a sleeve bearing or seal;
   said ring having a series of evenly spaced radial channels, said channels extending from an inner diameter of said ring to an outer diameter of said ring, said channels having a depth; and
   said ring having an upper surface, said upper surface comprising a series of planar surfaces alternating with a series of openings, said openings disposed at an upper end of said channels.

2. The reverse vortex ring, as described in claim 1, wherein said inner diameter is equal to an interior diameter of said sleeve bearing or seal.

3. The reverse vortex ring, as described in claim 1, wherein said outer diameter is equal to an exterior diameter said sleeve bearing or seal.

4. The reverse vortex ring, as described in claim 1, wherein said radial channels are semi-cylindrical.

5. The reverse vortex ring, as described in claim 4, wherein said radial channels have a diameter and said depth is a predetermined portion of said diameter.

6. The reverse vortex ring, as described in claim 5, wherein said predetermined portion is less than 85% of said diameter.

7. The reverse vortex ring, as described in claim 1, wherein said radial channels are rectangular in cross-section.

8. The reverse vortex ring, as described in claim 7, wherein a height-to-width ratio of said channels is greater than 0.5 and less than 1.5.

9. The reverse vortex ring, as described in claim 7, wherein said radial channels taper from said outer diameter to said inner diameter of said ring.

10. The reverse vortex ring, as described in claim 7, wherein said planar surfaces taper from said outer diameter to said inner diameter of said ring.

* * * * *